United States Patent [19]

Follmer

[11] Patent Number: 4,735,086

[45] Date of Patent: Apr. 5, 1988

[54] THICK FILM MASS AIRFLOW METER WITH MINIMAL THERMAL RADIATION LOSS

[75] Inventor: William C. Follmer, Livonia, Mich.

[73] Assignee: Ford Motor Company, Dearborn, Mich.

[21] Appl. No.: 66,783

[22] Filed: Jun. 26, 1987

[51] Int. Cl.⁴ .............................................. G01F 1/68
[52] U.S. Cl. ....................................................... 73/204
[58] Field of Search .......................................... 73/204

[56] References Cited

U.S. PATENT DOCUMENTS

| | | | |
|---|---|---|---|
| 1,321,546 | 11/1919 | Packard | 73/204 |
| 3,680,377 | 8/1972 | Lightner | 73/204 |
| 4,214,478 | 7/1980 | Lauterbach | 73/204 |
| 4,283,944 | 8/1981 | Gruner et al. | 73/204 |
| 4,400,975 | 8/1983 | McGarr | 73/204 |
| 4,635,475 | 1/1987 | Jones et al. | 73/204 |

OTHER PUBLICATIONS

SAE 860406, "Mass Airflow Sensor: Ambient Temperature Compensation Design Considerations", by Gurtcheff et al.—no date.

*Primary Examiner*—Herbert Goldstein
*Attorney, Agent, or Firm*—Allan J. Lippa; Peter Abolins

[57] ABSTRACT

A mass airflow meter having a first electrically heated resistive film and a temperature dependent resistive film sandwiched between plastic layers and positioned within an air duct. Symmetrically positioned around the first resistive film are a pair of electrically heated resistive films and associated temperature sensors, also encapsulated within plastic layers. Electronic circuitry applies electric power to the resistive films for maintaining each of them at a predetermined temperature above ambient air temperature regardless of airflow. Since the temperature and emissivity of each plastic layer is substantially equal, the thermal radiation of each is also substantially equal. The thermal radiation loss by the first resistive film is therefore balanced by a substantially equal thermal radiation gain. Accordingly, substantially all the heat transfer by the first resistive film is through convectional heat transfer to the airflow. An accurate measurement of airflow is thereby achieved.

9 Claims, 2 Drawing Sheets

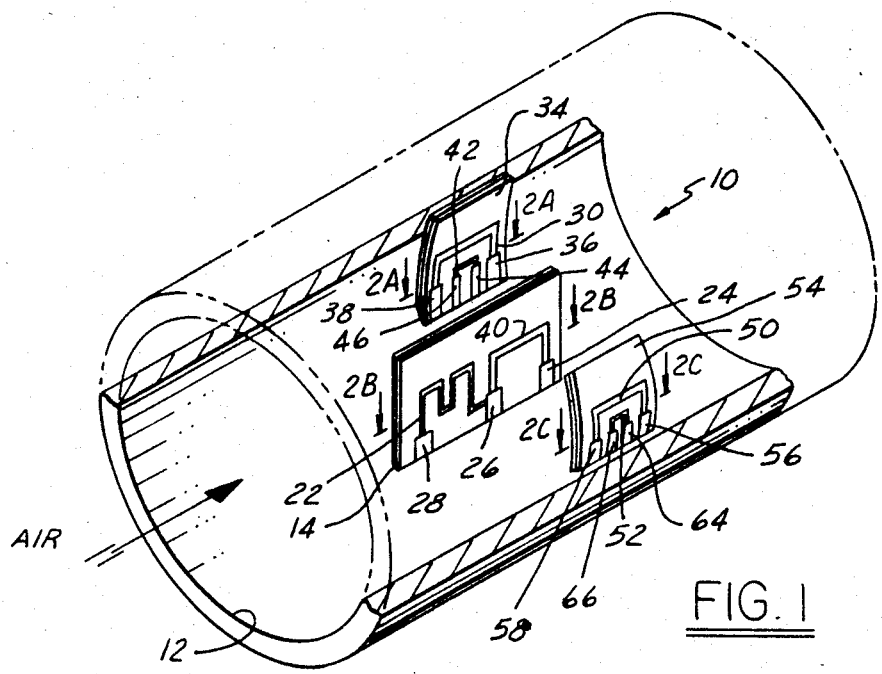
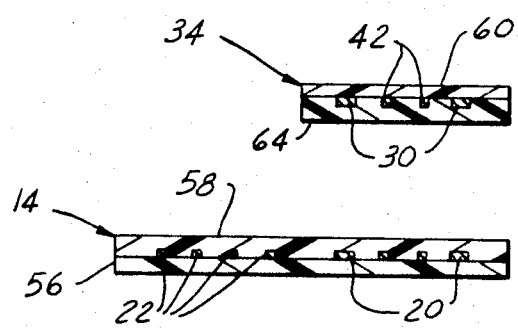
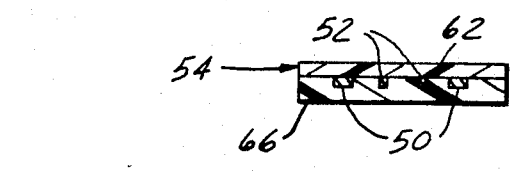

THICK FILM MASS AIRFLOW METER WITH MINIMAL THERMAL RADIATION LOSS

BACKGROUND OF THE INVENTION

The inventions relates to an apparatus for the measurement of fluid flow. More specifically, the invention relates to a mass airflow meter wherein the electrical properties of a resistive element vary in proportion to the mass of air flowing across the element.

Mass airflow meters containing resistive elements are known for providing an electrical measurement of the mass of air inducted into an internal combustion engine per unit of time. A resistive element, such as a resistive wire or a resistive film, is disposed within the airflow and electrically heated by passing electric current therethrough. The electric power applied to the resistive element is controlled to maintain a substantially constant element temperature regardless of airflow. Stated another way, the electric power applied to the resistive element is controlled to maintain a constant resistance as the heat transfer by convection to the mass airflow changes. Accordingly, a measurement of the electric power may be translated into a measurement of the airflow. However, there is also heat transfer from the resistive element by conduction to contiguous surfaces and also heat transfer by thermal radiation. Unless the heat transfer by conduction and radiation are both negligible, the measurement of airflow will be in error.

For mass airflow meters which utilize a resistive wire, heat transfer by conduction and radiation are generally minimal. In a typical hot wire airflow meter, a 70 micron platinum wire several inches in length is stretched between two support members. The portion or the wire in contact with the support members is sufficiently small with respect to the overall wire length such that heat transfer by conduction to the support members may be ignored. With respect to heat transfer by radiation, the small surface area and low emissivity of the wire result in negligible thermal radiation as compared to heat transfer by convection.

In the case of a hot resistive film such as a nickel foil deposited on a substrate, however, the conductive heat transfer between the film and substrate may be appreciable. Approaches have been utilized to heat the substrate and thereby reduce the conductive heat transfer. For example, see U.S. Pat. Nos. 4,214,478 and 4,283,944. Heat transfer by radiation, however, is generally not a problem in these approaches. Even though the surface area of resistive films is large compared to a wire, the low emissivity of the film results in minimal radiation as compared to the heat conducted between the film and the substrate.

Heat transfer by radiation has been recognized to be a problem in a configuration wherein the resistive film is coated or sandwiched between layers of either plastic or glass. In these flowmeters, thermal radiation cannot be ignored due to the relatively high emissivity of the coating and the relatively large surface area of the resistive film. For example, see SAE 860406, entitled "Mass Airflow Sensor: Ambient Temperature Compensation Design Considerations", by G. A. Gurtcheff and L. D. Hazelton. This paper proposes lowering the emissivity by covering the plastic coating with a shiny metal such as gold. A disadvantage of this approach, besides expense, is that dirt accumulation and erosion will eventually raise the emissivity of the coating thereby increasing thermal radiation.

SUMMARY OF THE INVENTION

It is an object of the present invention to provide a mass fluid flow meter with minimal measuring error due to thermal radiation.

In accordance with an embodiment of the invention, the above and other problems are overcome by providing a mass airflow sensor comprising: a first resistive film positioned within a duct, means for sensing ambient air temperature of the airflow, means for applying electric power to the first resistive film to maintain a predetermined temperature above ambient temperature, the electric power thereby providing a measurement of mass airflow, a second resistive film positioned within the airflow and spatially separated from the first resistive film to direct radiant energy to the first resistive film, means for sensing the temperature of the second resistive film, means responsive to the ambient air temperature sensing means and the second resistive film temperature sensing means to heat the second resistive film to the predetermined temperature above ambient temperature. Accordingly, the first resistive film will always receive approximately the same radiant energy that it radiates regardless of the airflow. Substantially all of the heat transferred from the first resistive film is therefore by convection to the surrounding airflow. An advantage is thereby obtained of more accurate mass airflow measurement.

DESCRIPTION OF THE DRAWINGS

FIG. 1 is a partially broken away perspective view of an embodiment in which the invention is used to advantage.

FIG. 2A is a cross-sectional view of a portion of FIG. 1 taken along line 2A—2A.

FIG. 2B is a cross-sectional view of a portion of FIG. 1 taken along line 2B—2B.

FIG. 2C is a cross-sectional view of a portion of FIG. 1 taken along line 2C—2C.

DESCRIPTION OF THE PREFERRED EMBODIMENT

Figure 3:
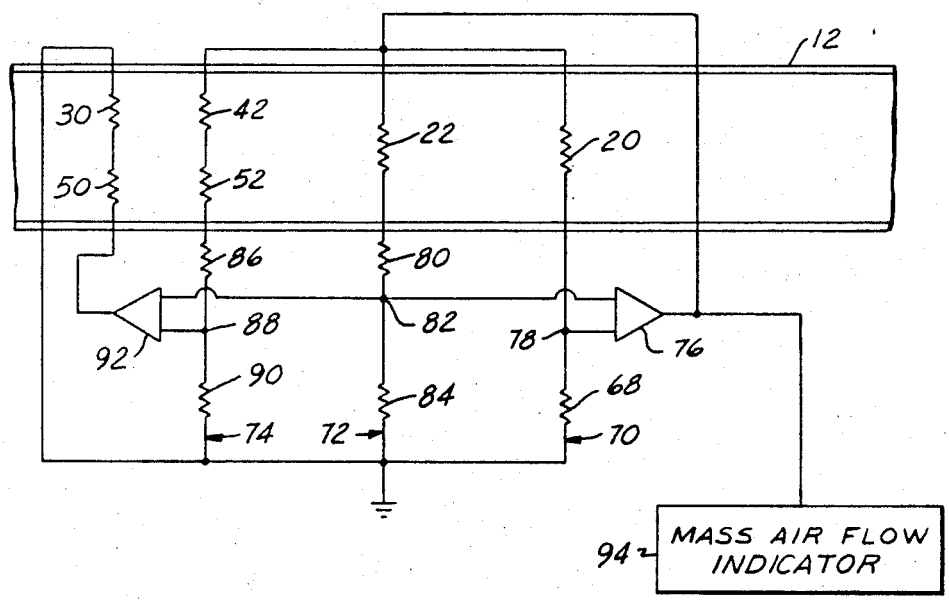
FIG. 3 is an electrical schematic of the embodiment shown in FIG. 1.

Referring to FIG. 1, the sensing elements of mass airflow meter 10 are shown positioned within an air duct or air intake 12 of an internal combustion engine. More specifically, plastic casing 14, preferably including two layers of polimide for encapsulating hot film resistor 20 and temperature dependent film resistor 22, is shown positioned parallel to the flow of inducted air. Both film resistors are fabricated from a material having a high temperature coefficient of resistance such as nickel foil.

Film resistor 20 and film resistor 22 are shown coupled through terminal 24, terminal 26 and terminal 28 to electrical control circuitry (FIG. 3). In general terms, which are described later herein with particular reference to FIG. 3, electric power is applied to maintain film resistor 20 at a constant predetermined temperature above ambient air temperature.

Continuing with FIG. 1, film resistor 30, preferably fabricated from nickel foil, is shown encapsulated within plastic casing 34 and coupled to the electrical control circuitry (FIG. 3) through terminal 36 and terminal 38. Temperature sensor or temperature dependent film resistor 42, preferably constructed from nickel foil, is also shown encapsulated within casing 34 and coupled to the electrical control circuitry (FIG. 3) through terminal 44 and terminal 46. Film resistor 42 is separated from film resistor 30 by a distance which is sufficiently small to permit thermal coupling through plastic casing 34, thereby enabling film resistor 42 to act as a temperature sensor of film resistor 30.

Similarly, hot film resistor 50 and temperature dependent film resistor 52 are shown encapsulated within plastic casing 54 and coupled to the electrical control circuitry (FIG. 3) through respective terminal 56, terminal 58, terminal 64, and terminal 66.

Referring now to FIGS. 2A through 2C, and continuing with FIG. 1, plastic casing 34 and plastic casing 54 have curved geometries and are symmetrically positioned around film resistor 20 for directing radiant energy thereto. Casing 14 is shown including bottom layer 56 of polimide and top layer 58 of polimide, each preferably having a thickness of from 2 to 3 mils. Bottom layer 56 acts as a substrate for forming film resistor 20 and film resistor 22 thereon by conventional sputter depositing and photolithographic techniques. Similarly, casing 34 and casing 54 are shown including respective bottom polimide layer 60 and bottom polimide layer 62, and respective top polimide layer 64 and top polimide layer 66. Film resistor 30, film resistor 42, film resistor 50, and film resistor 52 are also deposited on respective bottom layer 60 and bottom layer 62 by the conventional techniques.

The casings are each fabricated from the same materials and therefore each has the same emissivity for radiant energy. Further, they each have the same thickness, thereby presenting the same thermal mass to respective film resistor 20, film resistor 30, and film resistor 50. Accordingly, by maintaining the temperature of film resistor 30 and film resistor 50 at the same temperature as film resistor 20, each of the outer surfaces of the casings is substantially equalized in temperature thereby balancing the radiant heat loss of film resistor 20 with a substantially equal radiant heat gain.

It should be understood that this balance between heat loss and heat gain is only achieved when the positioning of casings 34 and 54 is such that they substantially surround the field of radiant flux from casing 56. Otherwise there would be a net thermal radiation loss from film resistor 20 resulting in a loss of accuracy in mass airflow measurement. Those skilled in the art will also recognize that the relative positioning of casings 34 and 54 should prevent thermal radiation from striking film resistor 22. Otherwise, an accurate reference to ambient air temperature cannot be obtained. The relative positioning of casings 34 and 54 may not be readily apparant from FIGS. 1, 2A, 2B and 2C since they are not drawn to accurate scale.

Referring to FIG. 3, the electrical operation of mass airflow meter 10 is now described. An electronic bridge is shown having arm 70, arm 72, and arm 74 connected in parallel to the output of differential amplifier 76. Arm 70 includes film resistor 20 connected in series through node 78 to resistor 68. Arm 72 includes the series interconnection of film resistor 22 and resistor 80 connected in series through node 82 to resistor 84. Arm 74 includes the series interconnection of film resistor 42, film resistor 52, and resistor 86 connected in series through node 88 to resistor 90. Node 78 and node 82 define one output diagonal of the bridge and are connected to the input of differential amplifier 76. The other output diagonal of the bridge is defined by node 82 and node 88 which are connected to the input of differential amplifier 92. Film resistor 30 and film resistor 50 are shown coupled to the output of differential amplifier 92. In a conventional manner, the resistance values of resistor 68, resistor 80, resistor 84, resistor 86, and resistor 90 are chosen such that the resistor ratios of each arm are equal for balanced bridge operation wherein the voltage across each output diagonal is approximately zero. In addition, resistor values for resistor 80, resistor 84, resistor 86, and resistor 90 are selected to prevent heating of film resistor 22, film resistor 42, and film resistor 52 by current flowing therethrough. Further, resistor values 68 and 20 are selected to enable appropriate heating of film resistor 20 by current flowing therethrough.

In operation, film resistor 20 is heated to a predetermined temperature above the ambient air temperature of approximately 100° C. regardless of ambient air temperature. Since temperature dependent film resistor 22 provide a reference to ambient air temperature through node 82, both film resistor 20 and film resistor 22 will vary in resistance the same percentage as ambient air temperature changes thereby maintaining equal resistance ratios in bridge arm 70 and bridge arm 72. A change in ambient air temperature will therefore not result in an erroneous measurement as airflow.

When mass airflow across film resistor 20 increases, the convectional heat transfer to the air cools film resistor 20 thereby reducing its resistance. The voltage which then appears across node 78 and node 82 is amplified and applied to both the mass airflow indicator 94 and the bridge arms by differential amplifier 76. Accordingly, the current flowing through film resistor 20 increases until film resistor 20 reaches the predetermined temperature above ambient temperature and the bridge returns to a balanced condition. The voltage applied by differential amplifier 76 to restore the balanced condition is related to the convectional heat transfer from film resistor 20 to the mass airflow. Mass airflow indicator 94, preferably a look-up memory, translates this voltage to a digital representation of mass airflow for use by the engine controller (not shown).

The same increase in mass airflow which cooled film resistor 20 also cools film resistor 30 and film resistor 50. In response, the resistance of temperature dependent resistor 42 and temperature dependent resistor 52, which are thermally coupled to respective film resistor 30 and film resistor 50, falls resulting in a voltage across node 82 and node 88. Differential amplifier 92 amplifies and applies this voltage to film resistor 30 and film resistor 50 until the bridge is again balanced. Since node 82 is also referenced to the ambient air temperature, film resistor 30 and film resistor 50 are maintained at the same predetermined temperature above ambient as film resistor 20.

As previously described herein, when film resistors 20, 30 and 50 are at substantially equal temperatures, the respective outer surfaces of casings 14, 34 and 54 are equalized in temperature thereby balancing the radiant heat loss of film resistor 20 with a substantially equal radiant heat gain. Accordingly, the predominate form of heat transfer from film resistor 20 is by convectional heat transfer to the surrounding mass airflow. An accurate measurement of mass airflow is thereby obtained.

This concludes the description of the preferred embodiment. The reading of it by those skilled in the art will bring to mind many alterations and modifications without departing from the spirit and scope of the invention. Accordingly, it is intended that the scope of the invention be limited only by the following claims.

I claim:

1. An airflow sensor for measuring the airflow through a duct, comprising:
   a first resistive film positioned within said duct;
   means for sensing ambient air temperature in said duct;
   means for applying electric power to said first resistive film to maintain its temperature at a predetermined temperature above ambient temperature;
   a second resistive film positioned within said duct and spacially separated from said first resistive film to direct radiant energy to said first resistive film;
   means for indicating the temperature of said second resistive film; and
   means responsive to said indicating means for heating said second resistive film to said predetermined temperature above ambient temperature thereby reducing the heat loss by radiation from said first resistive film.

2. The apparatus recited in claim 1 wherein said second resistive film is composed of two segments symmetrically positioned around said first resistive film.

3. The apparatus recited in claim 1 wherein said ambient air temperature sensing means comprises a resistive film.

4. The apparatus recited in claim 3 wherein said temperature indicating means comprises a resistive film.

5. The apparatus recited in claim 4, further comprising means for electrically interconnecting said first resistive film and said ambient air temperature sensing means and said temperature indicating means together as parallel arms in an electrical bridge.

6. The apparatus recited in claim 5 wherein said electric power supplying means supplies electric power to said electrical bridge.

7. The apparatus recited in claim 6 wherein each of said resistive films is comprised of a nickel foil.

8. A mass airflow sensor for measuring the mass airflow through a duct, comprising:
   a first substrate positioned in said duct;
   a first resistive film mounted on said first substrate;
   means mounted on said first substrate for sensing ambient air temperature, said sensing means comprising a temperature dependent resistive film;
   means responsive to said sensing means and said first resistive film for supplying electric power to said first resistive film to heat said first resistive film to a predetermined temperature above said ambient air temperature regardless of the airflow across said first resistive film;
   a second substrate positioned in said duct and spaced from said first substrate;
   a second resistive film mounted on said second substrate;
   first indicating means mounted on said second substrate for indicating the temperature of said second resistive film, said first indicating means comprising a temperature dependent resistive film;
   a third substrate positioned in said duct and symmetrically positioned from said first substrate in relation to said second substrate;
   a third resistive film mounted on said third substrate;
   second indicating means mounted on said third substrate for sensing the temperature of said third resistive film; and
   means responsive to said first indicating means and said second indicating means for providing electric power to said second resistive film and said third resistive film to maintain their temperatures at said predetermined temperature above said ambient temperature thereby reducing the heat loss by radiation from said first resistive film.

9. The apparatus recited in claim 8, further comprising a coating over each of said resistive films.

* * * * *